UNITED STATES PATENT OFFICE.

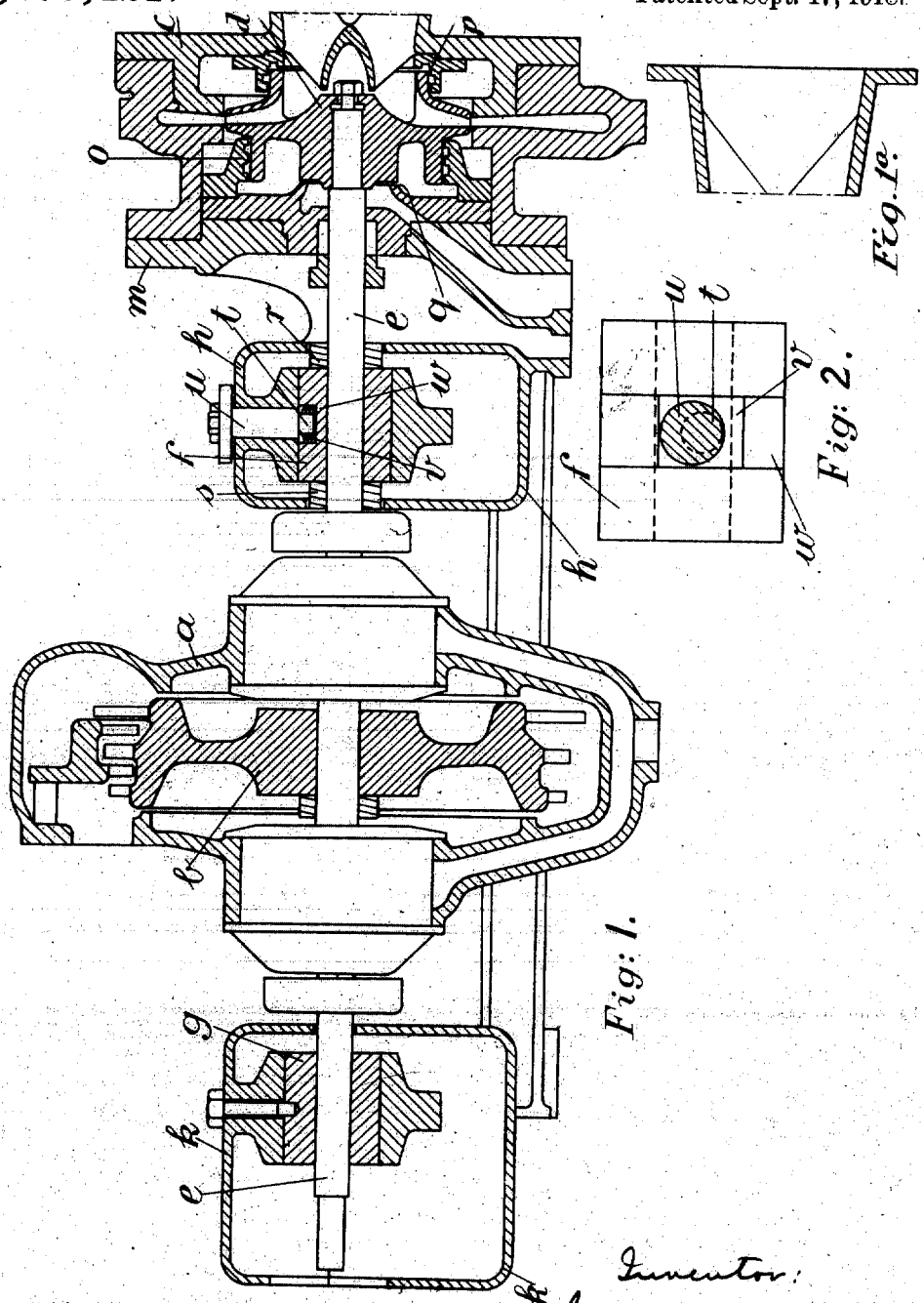

JOSEPH PETERMÖLLER, OF CATHCART, GLASGOW, SCOTLAND, ASSIGNOR TO G. & J. WEIR, LIMITED, OF CATHCART, GLASGOW, SCOTLAND.

STEAM-TURBINE-DRIVEN CENTRIFUGAL PUMP.

1,279,421. Specification of Letters Patent. Patented Sept. 17, 1918.

Application filed December 22, 1914. Serial No. 878,607.

*To all whom it may concern:*

Be it known that I, JOSEPH PETERMÖLLER, a subject of the Emperor of Germany, residing at 40 Balmoral avenue, Cathcart, Glasgow, Scotland, have invented certain new and useful Improvements Relating to Steam-Turbine-Driven Centrifugal Pumps; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

My invention relates to centrifugal pumps driven directly by steam turbines, the turbine and pump rotors being mounted on a common shaft. The object of the invention is to allow of the construction of a unit of this nature which can be put into action quickly without previous heating up, and without serious risk of injury due to unequal expansion, and in which, moreover, the axial clearances between the rotor and stator of the pump can be kept extremely small.

My invention—which will be described in the following specification and more particularly defined in the annexed claim—involves the employment of a pump of the single-stage, single-admission balanced type, and a turbine of the single-pressure-stage impulse type, the rotor of the turbine, therefore, having very little tendency to move axially due to steam pressure. The turbine and pump rotors are mounted on a common shaft but within separate stator casings. The pump suction is arranged at the side of the pump remote from the turbine. Two bearings are provided for the common shaft—the first between the turbine and the pump and the second on the other side of the turbine. Means are provided for adjusting the first bearing in a direction parallel to the axis of the shaft, and the shaft is provided with a guide collar on each side of this bearing, each of the two collars being adapted to engage—when necessary—with one or other side of the bearing, in order to limit the axial movement of the shaft and prevent the rotor of the pump from coming into contact with the stator.

In the accompanying drawing:—

Figure 1 is a longitudinal section through a unit according to my invention.

Fig. 1ª shows the extreme end of the inlet pipe of the centrifugal pump.

Fig. 2 is a plan—drawn to an enlarged scale—of the middle bearing and illustrates the means for adjusting this bearing.

$a$ is the turbine casing and $b$ the turbine rotor. $c$ is the pump casing and $d$ the pump rotor. $e$ is the common shaft for the two rotors, which shaft is supported in a bearing $f$ situated between the turbine and the pump and a bearing $g$ beyond the turbine. These bearings are supported in casings $h\ k$ of which the casing $h$ is formed integrally with, or rigidly attached to, the adjacent cover $m$ of the pump casing or other structural part of the pump casing. The pump rotor is formed with very fine axial clearance at $q$, and any contact between rotor and stator at this place should be prevented. It has also very fine radial clearance at $o$ and $p$ and it is of course desirable that, if the packing rings should once touch the impeller $d$ and cut a groove in it, this groove should not be widened by the shaft traveling axially. The pump is arranged to be balanced when running, but, when being put into action or on other occasions, there may be a tendency for end movement on the shaft and it is therefore necessary to provide guide collars. These guide collars, according to my invention, are placed on either side of the axially movable bearing $f$ and are represented by $r$ and $s$. They are fixed on, and rotate with, the shaft, and allow the shaft very little end movement with respect to the bearing $f$. This bearing can have its longitudinal or axial position adjusted by means of the pin $t$ which is carried eccentrically by the shaft $u$, means being provided for rotating this shaft through the necessary angle. The pin $t$ works in a slipper $v$ which is adapted to slide in a transverse slot $w$ cut in the bearing. Other means of adjusting the bearing may, however, be employed. The adjustability of the bearing $f$ allows of the fine axial clearance or clearances at the pump to be regulated as desired.

Various designs of pump rotor and casing may be employed, especially as regards the water packing and balancing arrangements. I do not confine myself to the precise details shown on the drawing, but in all cases I desire, in order to reduce to a minimum the leakage of water and at the same time to prevent or limit injury due to contact between stator and rotor, to confine the axial movement of the pump rotor within very fine limits.

By placing the guide collars on the two sides of the bearing $f$, I secure three advantages. (1) No parts subjected to steam pressure—and consequently liable to great ranges of temperature—are interposed between the guide collars and the fine clearances in the pump. (2) The length of shaft between the guide collars and the fine clearances on the pump is comparatively short. (3) The guide collars engage with a bearing which is held in a member rigidly and directly connected to the pump casing.

By means of my invention it is possible to construct a turbine pump unit, in which, in spite of a high water pressure, it is possible to prevent anything but a very small leakage of water, and at the same time provide a unit which can be started up quickly without previous heating and without risk of injury and, moreover, a unit which is simple, efficient, and compact.

Having thus described my invention, what I claim as new and desire to secure by Letters Patent is:—

In a steam turbine driven centrifugal pump the combination of a stator, a rotor, a pump casing, a pump rotor, a common shaft on which said rotors are mounted, an axially movable journal bearing for the shaft, a pair of collars on the shaft engaging with said journal bearing on opposite sides, and an eccentrically mounted pin engaging with said journal bearing for shifting said guide collars to limit the axial movement of said shaft, substantially as set forth.

In testimony whereof I have signed my name to this specification in the presence of two subscribing witnesses.

JOSEPH PETERMÖLLER.

Witnesses:
JAMES DAYTON IMRIE,
THOMAS ALEXANDER LOGAN.